United States Patent
Tanikawa et al.

(10) Patent No.: US 7,609,440 B2
(45) Date of Patent: Oct. 27, 2009

(54) IN-VIVO EXAMINATION APPARATUS

(75) Inventors: Yoshihisa Tanikawa, Chuo-ku (JP); Yoshihiro Kawano, Hachioji (JP)

(73) Assignee: Olympus Corporation, Tokyo (JP)

( * ) Notice: Subject to any disclaimer, the term of this patent is extended or adjusted under 35 U.S.C. 154(b) by 337 days.

(21) Appl. No.: 11/667,338

(22) PCT Filed: Nov. 9, 2005

(86) PCT No.: PCT/JP2005/020527

§ 371 (c)(1),
(2), (4) Date: May 7, 2007

(87) PCT Pub. No.: WO2006/051811

PCT Pub. Date: May 18, 2006

(65) Prior Publication Data

US 2009/0067042 A1     Mar. 12, 2009

(30) Foreign Application Priority Data

Nov. 10, 2004 (JP) ............................. 2004-326429
Jan. 27, 2005 (JP) ............................. 2005-019880

(51) Int. Cl.
*G02B 21/00* (2006.01)
*A61B 1/06* (2006.01)
(52) U.S. Cl. .................. 359/368; 600/160; 385/117
(58) Field of Classification Search ................ 359/363, 359/368, 369; 385/117; 356/317, 318; 600/160
See application file for complete search history.

(56) References Cited

U.S. PATENT DOCUMENTS

2005/0054937 A1 * 3/2005 Takaoka et al. ............. 600/476

2005/0078924 A1    4/2005   Viellerobe et al.

FOREIGN PATENT DOCUMENTS

| JP | 3-115958 | 5/1991 |
|---|---|---|
| JP | 2000-275539 | 6/2000 |
| JP | 2002-182118 | 6/2002 |
| JP | 2002-243641 | 8/2002 |
| JP | 2003-307682 | 10/2003 |
| WO | 03/056378 | 7/2003 |

* cited by examiner

*Primary Examiner*—Alessandro Amari
(74) *Attorney, Agent, or Firm*—Kenyon & Kenyon LLP

(57) ABSTRACT

When carrying out in vivo examination of a living organism, the behavior in the interior thereof is continuously observed with clear images. Provided is an in-vivo examination apparatus 1 comprising an optical unit 4 including a light source 2 and an image acquisition device 3; and an observation head 5, which is disposed with a gap with respect to the optical unit 4 and which is fixed to a living organism A, wherein the optical unit 4 includes a first collimator optical system 7 for converting light from the light source 2 into collimated light $L_1$ and introducing it into the observation head 5 and an image-forming optical system 9 for focusing return light from the observation head 5 to form an image at the image-acquisition device 3, and wherein the observation optical head 5 includes a second collimator optical system 15 for focusing the collimated light $L_1$ incident from the optical unit 4 to irradiate an examination target site B in the living organism A, as well as for converting return light from the living organism into collimated light $L_2$ and introducing it into the optical unit 4.

8 Claims, 5 Drawing Sheets

IN-VIVO EXAMINATION APPARATUS

TECHNICAL FIELD

The present invention relates to in-vivo examination apparatuses for examining organisms while they are still alive (in vivo).

BACKGROUND ART

Recently, visualization of ion concentration, membrane potential an so forth has been performed with fluorescence probes using optical microscopes; as specimens, for example, observation of the biological function of nerve cells and so forth, particularly the observation of dynamic behavior, has been carried out.

A known apparatus for observing such dynamic behavior is a microscope photography apparatus (for example, see Patent Document 1).

Patent Document 1: Japanese Unexamined Patent Application, Publication No. 2000-275539.

DISCLOSURE OF INVENTION

However, although conventional microscope photography apparatuses such as this take photographs adapted to the dynamic behavior of the specimen, because they selectively acquire images of the dynamic behavior of the specimen in a stationary, in-focus state while keeping the focal length of the camera constant, they suffer from problems such as choppiness of the acquired images, missing portions of the observed images, and discontinuous and jerky motion, thus making observation difficult.

In particular, when the amount of motion of the specimen in the direction of the optical axis of the camera is large, the stationary, in-focus state is limited to only an instant of the entire motion; hence, the method in Patent Document 1 for selectively acquiring images in a stationary, in-focus state suffers from the problem that it is not possible to obtain sufficient information required for observation.

In addition, because the specimen, such as a laboratory animal, is examined in vivo, it may be necessary to observe the internal conditions while allowing normal activity of the specimen. In such a case, because the specimen moves significantly, there is a problem in that it is not possible to carry out observation with the microscope photography apparatus of Patent Document 1.

The present invention has been conceived in light of the circumstances described above, and an object thereof is to provide an in-vivo examination apparatus which can observe continuous, clear images of the state in the interior of a living organism during in vivo examination, particularly while allowing normal activity of the living organism.

To realize the object described above, the present invention provides the following solutions.

The present invention provides an in-vivo examination apparatus comprising an optical unit including a light source and an image acquisition device; and an observation head, which is disposed with a gap with respect to the optical unit and which is fixed to a living organism. The optical unit includes a first collimator optical system for converting light from the light source into collimated light and introducing the collimated light into the observation head and an image-forming optical system for focusing return light from the observation head to form an image at the image-acquisition device. The observation optical head includes a second collimator optical system for focusing the collimated light introduced from the optical unit to irradiate an examination target site in the living organism, as well as for converting return light from the living organism into collimated light and introducing the collimated light into the optical unit.

According to the present invention, the light emitted from the light source is emitted from the optical unit to the observation head in the form of collimated light, collimated by the first collimator optical system. The observation head is fixed to the living organism, and when the collimated light emitted from the optical unit is introduced into the observation head, the second collimator optical system focuses that collimated light and irradiates the examination target site inside the living organism. The return light returning from the examination target site irradiated with the light from the light source, upon returning to the observation head, passes through the second collimator optical system where it is converted into collimated light again and is emitted towards optical unit from the observation head. The collimated light introduced into the optical unit forms an image upon being transmitted through the image-forming optical system and is acquired by the image-acquisition device.

In this case, because the observation head is fixed to the living organism, it moves together with the motion of the living organism, which allows the relative positional relationship with respect to the examination target site in the living organism to be kept constant. Therefore, because both the illumination light going from the optical unit to the observation head and the return light going from the observation head to the optical unit are collimated light, even if the optical unit and the observation head move relative to each other in the optical axis direction due to dynamic motion of the living organism, there is no shifting of the image acquired by the image-acquisition device. Therefore, it is possible to continuously acquire blur-free clear images of a living organism exhibiting dynamic motion and shifting in the optical-axis direction together with the observation head.

In the invention described above, the image-forming optical system is preferably formed of an fθ lens.

By doing so, even if the angle of the collimated light returning from the observation head changes, it is corrected by passing through the image-forming optical system formed of an fθ lens and is acquired by the image-acquisition device. Therefore, it is also possible to acquire clear images in this case.

In the invention described above, the optical unit and the observation head are preferably connected by an optical fiber bundle.

By doing so, the light emitted from the light source is sent to the observation head through the optical fiber bundle. The observation head irradiates the living organism with the light sent through the optical fiber bundle and receives return light from the living organism. Therefore, it is possible to examine the living organism, by acquiring the received return light with the image-acquisition device.

In this case, because the observation head is fixed to the living organism, even if the living organism moves over a relatively wide range, the relative positional relationship between the living organism and the observation head is not violated but is kept constant. In addition, because the light emitted from the light source is transmitted with the flexible optical fiber bundle, even if the living organism moves over a relative wide range, it is possible to reliably transmit the light from the optical unit to the observation head by freely bending the optical fiber bundle. Therefore, it is possible to clearly and continuously perform in vivo examination of the conditions inside the living organism while allowing normal activity of the living organism.

The present invention provides an in-vivo examination apparatus comprising a light source; a scanning unit for two-dimensionally scanning light from the light source; an observation head, fixed to a living organism, for irradiating the living organism with the light scanned by the scanning unit and receiving return light from the living organism; and a light detector for detecting the return light received by the observation head. The scanning unit includes a first collimator optical system for converting the scanned light into collimated light and introducing the collimated light into the observation head. The observation head includes a second collimator optical system for focusing the collimated light introduced from the scanning unit to form an image at an examination target site in the living organism, as well as for converting the return light from the living organism into collimated light and introducing the collimated light into the scanning unit.

According to the present invention, the light emitted from the light source is two-dimensionally scanned by the scanning unit, is converted to collimated light by passing through the first collimator optical system provided in the scanning unit, and is introduced into the observation head. In the observation head, the introduced collimated light is imaged at the examination target site in the living organism upon passing through the second collimator optical system. Then, the return light returning from the examination target site, upon passing through the second collimator optical system, returns to the scanning unit as collimated light and is detected by the light detector.

In this case, because the observation head is fixed to the living organism, it moves together with the motion of the living organism, and the relative positional relationship between the living organism and the examination target site can thus be kept constant. Because both the light going from the scanning unit to the observation head and the return light going from the observation head to the scanning unit are collimated light, even if the scanning unit and the observation head move relative to each other in the optical axis direction due to dynamic motion of the living organism, there is no shifting of the light detected by the light detector. Therefore, it is possible to continuously acquire clear images of a living organism exhibiting dynamic motion and moving in the optical axis direction together with the observation head.

In the invention described above, the observation head and the scanning unit are preferably connected by an optical fiber bundle.

With this configuration, the light emitted from the light source is two-dimensionally scanned by the scanning unit and is sent to the observation head through the optical fiber bundle. The observation head irradiates the living organism with the light sent through the optical fiber bundle and receives the return light from the living organism. Therefore, it is possible to examine the living organism by detecting the received return light with the light detector.

In this case, because the observation head is fixed to the living organism, even if the living organism moves over a relatively wide range, the relative positional relationship between the living organism and the observation head is not violated but is kept constant. In addition, because the light scanned by the scanning unit is transmitted through the flexible optical fiber bundle, even if the living organism moves over a relatively wide range of motion, the light from the scanning unit can be reliably transmitted to the observation head by freely bending the optical fiber bundle. Therefore, it is possible to continuously and clearly perform in vivo examination of the conditions inside the living organism while allowing normal activity of the living organism.

In the invention described above, fixing means for fixing the observation head to the living organism is preferably provided in the observation head.

The observation head can be easily fixed to the living organism with the fixing means. In addition, by fixing it more reliably, even if the living organism moves significantly, it is possible to maintain the relative positional relationship between the living organism and the observation head, and it is thus possible to perform examination without causing blurring of the images.

According to the present invention, because the observation head is separated from the optical unit or the scanning unit and the observation head is fixed to the living organism, even if the living organism moves, it is possible to perform examination while maintaining a fixed relative positional relationship between the living organism and the observation head. Furthermore, by coupling the observation head and either the optical unit or the scanning unit with collimated light, there is no change to the image-forming relationship even if the relative distance between them changes. Therefore, an advantage is afforded in that it is possible to perform clear and continuous observation of the conditions inside the living organism, even if the living organism exhibits dynamic motion.

The present invention affords an advantage in that, because the optical unit and the observation head, or the observation head and the scanning unit, are connected with the optical fiber bundle, it is possible to perform clear and continuous observation of the conditions inside the living organism while allowing normal activity of the living organism.

BEST MODE FOR CARRYING OUT THE INVENTION

An in-vivo examination apparatus 1 according to a first embodiment of the present invention will be described below with reference to FIG. 1.

Figure 1:
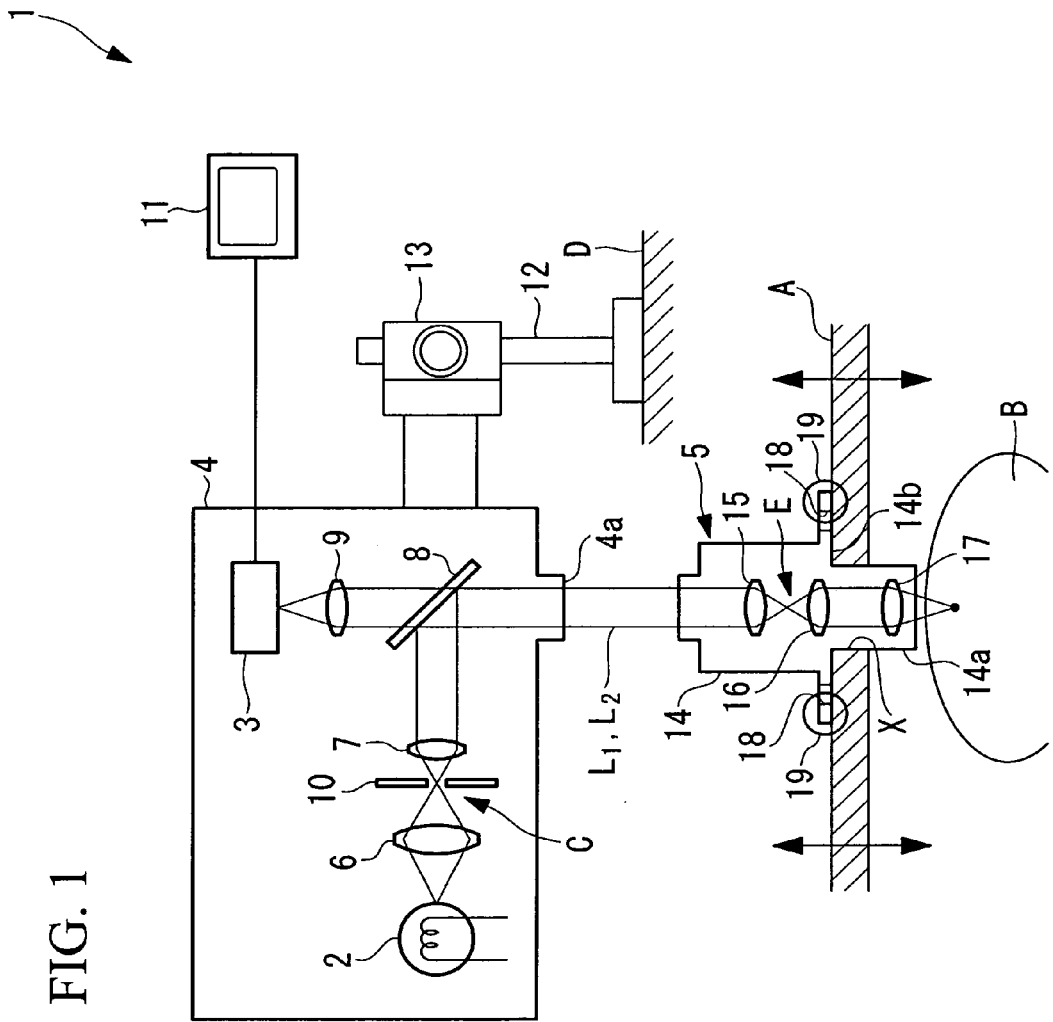
FIG. 1 is a diagram showing the overall configuration of an in-vivo examination apparatus according to a first embodiment of the present invention.

As shown in FIG. 1, the in-vivo examination apparatus 1 according to this embodiment includes an optical unit 4 provided with a light source 2 for emitting illumination light and an image-acquisition device (for example, a charged coupled device: CCD) 3; and an observation head 5, which is secured to a living organism A such as a laboratory animal, for receiving light emitted from the optical unit 4 and illuminating an observation target site B in the living organism A, as well as for emitting return light from the living organism A towards the optical unit 4.

The optical unit 4 includes a focusing lens 6 for focusing light from the light source 2 to form an intermediate image C, a collimator lens (first collimator optical system) 7 for collecting light forming the intermediate image C and collimating it, a half mirror 8, and a focusing lens 9 for focusing the light sent from the observation head 5. Reference numeral 10 in the figure is an aperture, disposed at the intermediate image C position, for restricting off-axis light.

The light emitted from the light source 2 forms the intermediate image C by means of the focusing lens 6, and after removing off-axis light with the aperture 10, it passes through the collimator lens 7 to be collimated; thereafter, it is reflected by the half-mirror 8 and is emitted from an opening 4a of the optical unit 4 towards the observation head 5 in the form of collimated light $L_1$. On the other hand, return light returning from the observation head 5 is introduced to the optical unit 4 via the opening 4a of the optical unit 4, passes through the half-mirror 8, is focused by the focusing lens 9, and is acquired by the image-acquisition device 3.

The image-acquisition device 3, which is connected to a monitor 1, displays an acquired image of the examination target site B.

The optical unit 4 is supported in such a manner that it can be raised and lowered by a raising-and-lowering mechanism 13 along a support column 12 which is attached to a securing structure D.

The observation head 5 includes, inside a casing 14, a focusing lens (second collimator optical system) 15 for focusing the collimated light $L_1$ emitted from the optical unit 4 and forming an intermediate image E, an image-forming lens 16 for converting the light forming the intermediate image E into collimated light, and an objective lens 17 for re-imaging the collimated light at the examination target site B in an internal organ or the like of the living organism A. On the other hand, when return light returning from the living organism A after irradiating the living organism A is introduced to the observation head 5, after being converted to collimated light by the objective lens 17 and forming the intermediate image E by the image-forming lens 16, it is collected by the focusing lens 15 to be converted again to collimated light $L_2$ and is then emitted towards the optical unit 4.

An insertion portion 14a for inserting into an incised portion X formed by incising the outer skin of the living organism A and a flange portion 14b which is brought into tight contact with the outer skin of the living organism A are provided in the casing 14 of the observation head 5. The objective lens 17 is disposed at the tip of the insertion portion 14a. A plurality of through-holes (fixing means) 18 are provided in the flange portion 14b, and using these through-holes 18, it is possible to stitch the observation head 5 to the living organism A using thread 19. By applying an adhesive (not shown in the drawing) to the contact portion of the flange portion 14b with the outer skin of the living organism A, it is possible to securely fix the living organism A and the observation head 5 relative to each other.

The operation of the in-vivo examination apparatus according to this embodiment, having such a configuration, will be described below.

Illumination light emitted from the light source 2 forms the intermediate image C by means of the focusing lens 6, and after removing off-axis light with the aperture 10, it passes through the collimator lens 7 to be converted to collimated light; thereafter, it is reflected by the half-mirror 8 and is emitted towards the observation head 5 in the form of the collimated light $L_1$ from the opening 4a of the optical unit 4.

The illumination light emitted from the optical unit 4 is introduced into the observation head 5, which is disposed opposite the opening 4a with a gap therebetween. The illumination light introduced into the observation head 5 forms the intermediate image E by means of the focusing lens 15, and thereafter is converted to collimated light by the image-forming lens 16 and is focused onto the examination target site B by the objective lens 17. Accordingly, the examination target site B is illuminated, and reflected light from the surface of the examination target site B returns towards the observation head 5. The reflected light entering the observation head 5 is collected by the objective lens 17 disposed at the tip of the insertion portion 14a, and after forming the intermediate image E by means of the image-forming lens 16, it is converted to the collimated light $L_2$ by the focusing lens 15 and is emitted towards the optical unit 4.

The collimated light $L_2$ emitted from the observation head 5 is introduced into the optical head 4 via the opening 4a of the optical unit 4, is transmitted through the half-mirror 8, and is focused on an image-acquisition surface of the image-acquisition device 3 by the focusing lens 9. Accordingly, an image of the examination target site B is acquired in the image-acquisition device 3 and is displayed on the monitor 11.

With the in-vivo examination apparatus 1 according to this embodiment, because the observation head 5 is more securely fixed to the living organism A with the thread 19 and the adhesive in this case, it is possible to more reliably prevent the objective lens 17 at the tip of the observation head 5 from shifting relative to the examination target site B inside the living organism A.

Therefore, it is possible to maintain the relative positional relationship between the objective lens 17 and the examination target site B, even if the living organism A dynamically moves.

Furthermore, with the in-vivo examination apparatus 1 according to this embodiment, because the emitted and incident beams between the optical unit 4 and the observation head 5 are collimated light $L_1$ and $L_2$, the imaging relationship does not change even if the optical unit 4 and the observation head 5 shift relative to each other in the optical axis direction. Therefore, when the examination target site B pulses due to, for example, the heart of the living organism A, even when the observation head 5 shifts in the optical axis direction together with that pulsing, it is possible to continuously acquire clear images of the examination target site B in the image-acquisition device 3 and to display them on the monitor 11.

Next, an in-vivo examination apparatus 20 according to a second embodiment of the present invention will be described with reference to FIG. 2.

In the description of this embodiment, parts having the same configuration as those in the in-vivo examination apparatus 1 according to the first embodiment described above are assigned the same reference numerals, and a description thereof is omitted.

Figure 2:
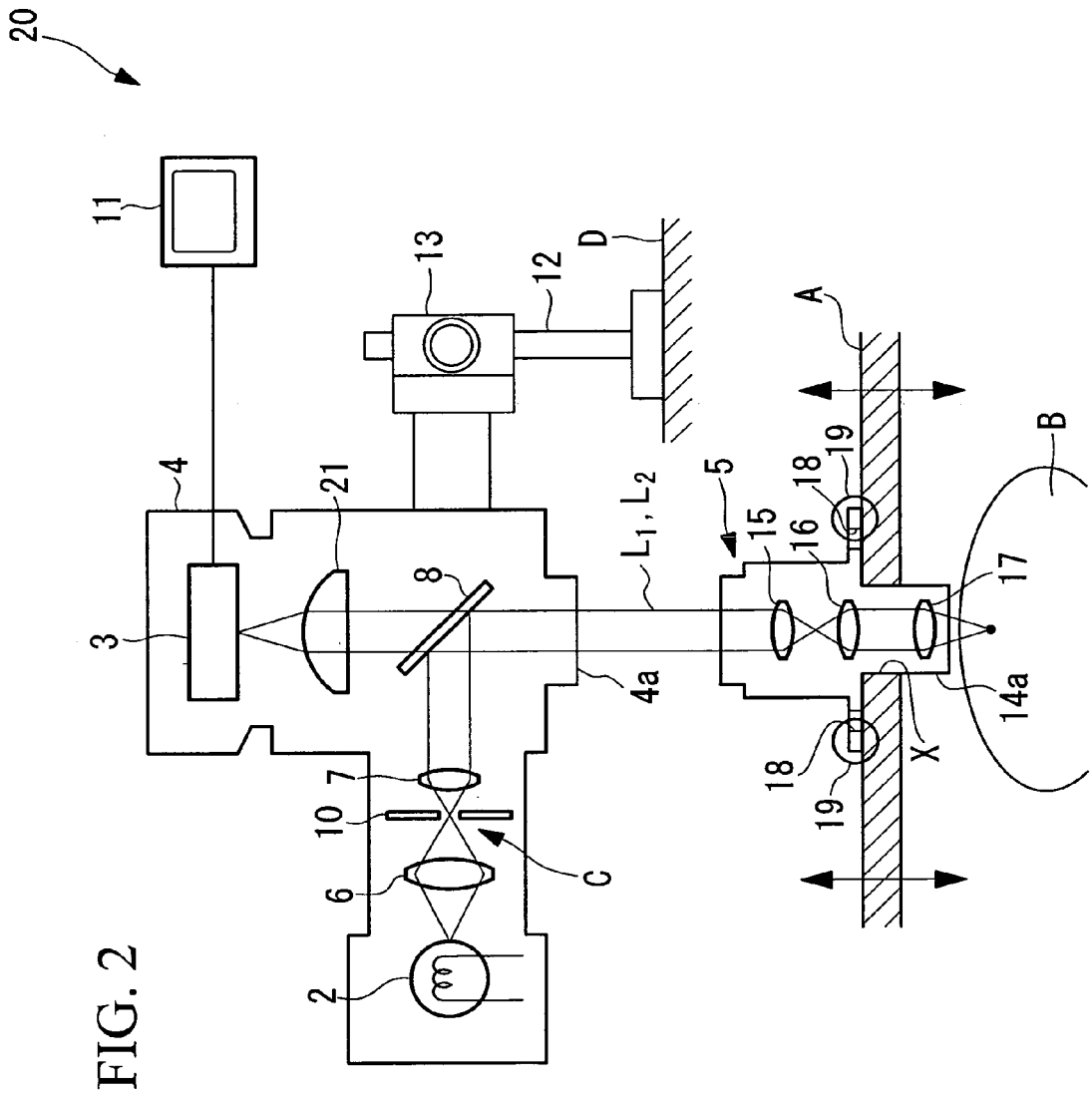
FIG. 2 is a diagram showing the overall configuration of an in-vivo examination apparatus according to a second embodiment of the present invention.

As shown in FIG. 2, the in-vivo examination apparatus 20 according to this embodiment differs from the in-vivo examination apparatus 1 of the first embodiment in that, the image-forming lens for imaging the return light on the image-acquisition device 3 is formed of an fθ lens 21.

According to this embodiment, when the collimated light $L_2$ returning from the observation head 5 is introduced into the optical unit 4 via the opening 4a, it is transmitted through the half-mirror 8 and is imaged by the fθ lens 21. Accordingly, an image of the examination target site B is acquired by the image-acquisition device 3.

In this case, because the image-forming lens for imaging the collimated light $L_2$ on the image-acquisition device 3 is formed of an fθ lens 21, even if the observation head 5 is tilted within a predetermine range with respect to the incidence optical axis of the collimated light $L_1$ to the observation head 5, tilting the optical axis of the collimated light $L_2$ returning inside the optical unit 4 from the observation head 5, the imaging condition is maintained at the image-acquisition surface of the image-acquisition device 3 by the fθ lens 21. Therefore, even if the observation head 5 is tilted due to the movement of the living organism A, it is possible to prevent the image from going out of focus thereby, thus allowing clear images to be continuously observed.

In this case, the image of the examination target site B moves on the monitor while remaining in focus; therefore, in order to prevent that, it is preferable to display it at the same position by performing image processing.

Next, an in-vivo examination apparatus 30 according to a third embodiment of the present invention will be described below with reference to FIG. 3.

In the description of this embodiment, parts having the same configuration as those in the in-vivo examination apparatus 1 according to the first embodiment described above are assigned the same reference numerals, and a description thereof is omitted.

Figure 3:
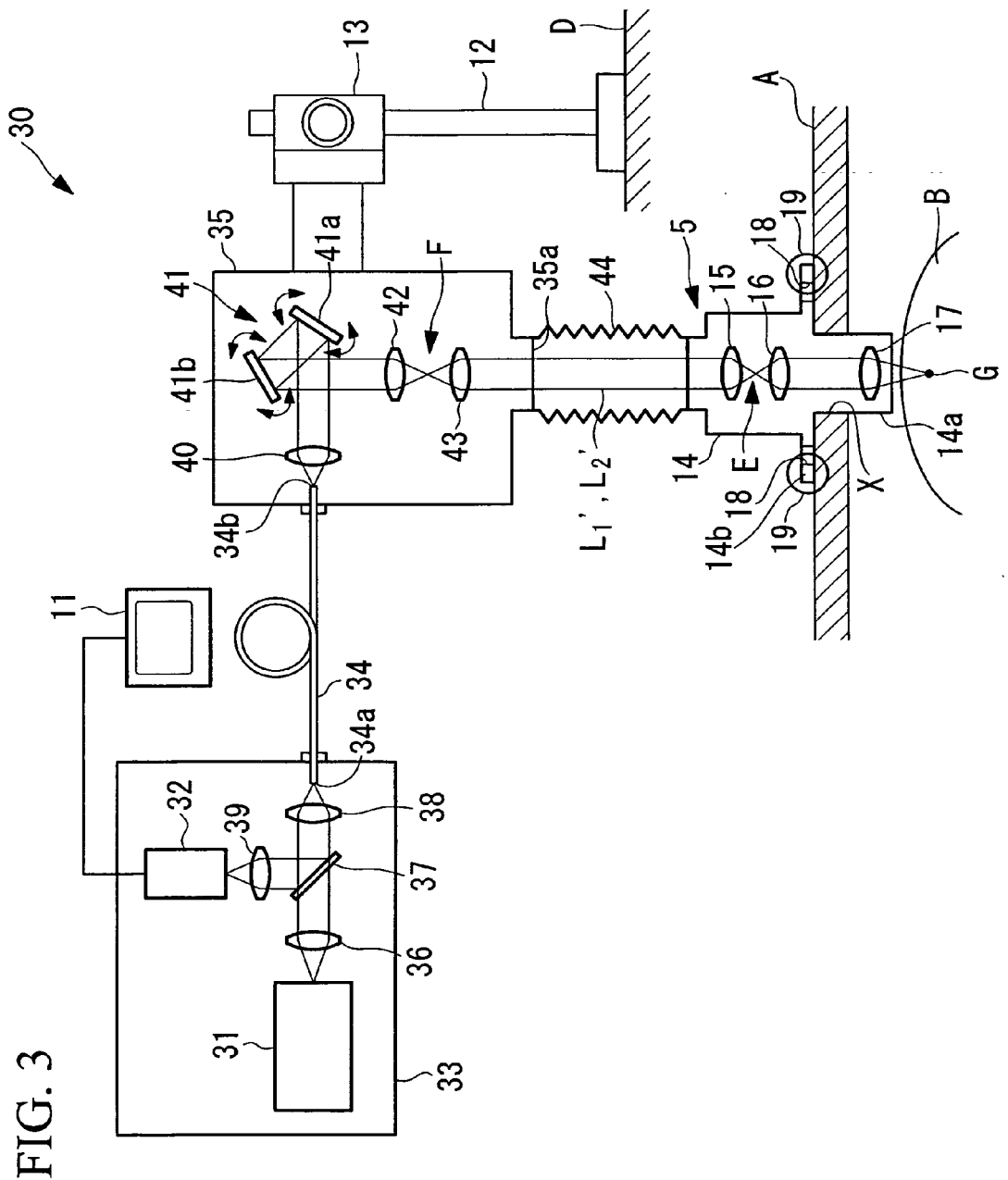
FIG. 3 is a diagram showing the overall configuration of an in-vivo examination apparatus according to a third embodiment of the present invention.

As shown in FIG. 3, the in-vivo examination apparatus 30 according to this embodiment includes an optical unit 33 including a laser light source 31 and a light detector 32; an optical fiber 34 for transmitting laser light from the laser light source 31 and fluorescence to the light detector 32; a scanning unit 35 for two-dimensionally scanning the laser light transmitted by the optical fiber 34; and an observation head 5 which is fixed to a living organism A, such as a laboratory animal.

A collimator lens 36, a dichroic mirror 37, and focusing lenses 38 and 39 are provided in the scanning unit 35. After the laser light emitted from the laser light source 31 is converted to collimated light by the collimator lens 36, it is transmitted through the dichroic mirror 37 and is focused onto a tip 34a of the optical fiber 34 by the focusing lens 38. On the other hand, after fluorescence emitted from the tip 34a of the optical fiber 34 is collimated by the focusing lens 38, it is reflected by the dichroic mirror 37 and is focused onto the light detector 32 by the focusing lens 39, where it is detected.

The light detector 32 is, for example, a photomultiplier tube.

The light detector 32 is connected to a monitor 11, and the monitor 11 displays a fluorescence image detected by the light detector 32.

The scanning unit 35 includes a first collimator lens 40 for converting the laser light transmitted by the optical fiber 34 into collimated light, a beam scanning unit 41 for deflecting the collimated light to scan it in two dimensions, a pupil-projection lens 42 for imaging the light emitted from the beam scanning unit 41 at the intermediate image position F, and a second collimator lens (collimator optical system) 43 for re-converting the light forming the intermediate image F into collimated light.

The beam scanning unit 41 includes, for example, two galvanometer mirrors 41a and 41b that can be respectively rotated about two mutually orthogonal axes.

In the in-vivo examination apparatus 30 according to this embodiment, the optical unit 33 and the scanning unit 35 are fixed at a desired position outside the living organism A.

The observation head 5 is fixed to the living organism A so as to oppose, with a gap therebetween, an opening 35a of the scanning unit 35. The scanning unit 35 and the observation head 5 are connected by a bellows member 44. The bellows member 44 covers the periphery of the beam so that laser light $L_1'$ emitted from the opening 35a of the scanning unit 35 and fluorescence $L_2'$ returning from the observation head 5 do not leak outside, and is also disposed so as to be capable of collapsing and expanding to allow the observation head 5 to move relative to the scanning unit 35.

The operation of the in-vivo examination apparatus 30 according to this embodiment, having such a configuration, will be described below.

The laser light emitted from the laser light source 31 is transmitted through the optical fiber 34 and enters the scanning unit 35, and after being converted to collimated light by the first collimator lens 40, it is deflected by the beam scanning unit 41, passes through the pupil projection lens 42 and the second collimator lens 43, and is emitted from the opening 35a of the scanning unit 35. Then, the laser light transmitted in the bellows member 44 enters the observation head 5, which is fixed to the living organism A, passes through the focusing lens 15, the image-forming lens 16, and the objective lens 17, and is imaged at the examination target site B inside the living organism A, where it generates fluorescence.

The fluorescence generated at the examination target site enters the observation head 5 via the objective lens 17 at the tip of the observation head 5, is emitted from the observation head 5 via the image-forming lens 16 and the pupil-projection lens 15, and passes through the bellows member 44 to return inside the scanning unit 35. In the scanning unit 35, it is incident on an end face 34b of the optical fiber 34 via the second collimator lens 43, the pupil-projection lens 42, the beam scanning unit 41, and the first collimator lens 40. The fluorescence introduced into the optical fiber 34 is transmitted through the optical fiber 34, returns to the optical unit 33, and after passing through the focusing lens 38, it is split off from the optical axis oriented in the direction of the laser light source 31 by the dichroic mirror 37, is detected at the light detector 32, and is displayed on the monitor 11.

In this case, because the image position G of the objective lens 17 in the examination target site B and the end face 34b of the optical fiber 34 in the scanning unit 35 are disposed in a conjugate positional relationship with each other, the end face 34b of the optical fiber 34 functions as a confocal pinhole. Therefore, only return light emitted from the image position G in the examination target site B enters the optical fiber 34 and returns inside the optical unit 33, and only fluorescence included therein is detected by the light detector 32. As a result, light emitted from regions other than the image position G in the examination target site B is not displayed on the monitor 11, and a two-dimensional image covering the image position G is clearly displayed.

With the in-vivo examination apparatus 30 according to this embodiment, the scanning unit 35 and the observation head 5 are separated and connected by the flexible bellows member 44. Therefore, by collapsing and expanding the bellows member 44, it is possible to freely change the relative position of the observation head 5 with respect to the scanning unit 35.

Because the scanning unit 35 has movable components such as the proximity galvanometer mirrors 41a and 41b, it is tends to become relatively large and heavy; however, by separating it from the observation head 5, the observation head 5 can have a compact and lightweight construction. Therefore, even though the observation head 5 is fixed to the living organism A, the load applied to the living organism A is not so large, and with the observation head 5 fixed to the living organism A, it is possible to reduce the stress placed on the living organism A, thus allowing normal activity; therefore, it is possible to perform examination of the living organism A under conditions closer to a resting state.

Because the exiting and entering light between the scanning unit 35 and the observation head 5 is the collimated light $L_1'$ and $L_2'$, there is no change in the imaging relationship even if the scanning unit 35 and the observation head 5 move relative to each other in the optical-axis direction. Therefore, when the examination target site B moves due to, for example, the heart in the living organism A, even if the observation head 5 moves in the optical-axis direction together with that pulsing, images of the examination target site B are continuously and clearly detected in the light detector 32 and are displayed on the monitor 11.

Because the scanning unit 35 includes movable components such as the proximity galvanometer mirrors 41a and 41b, if a large acceleration is applied, there is a possibility that the operation of the proximity galvanometer mirrors 41a and 41b will be affected thereby, and it may not be possible to perform scanning correctly. However, it is possible to avoid such problems by separating the scanning unit 35 from the observation head 5, which is fixed to the living organism A, and securing it outside the living organism A, as in this embodiment.

In the embodiment described above, by connecting the scanning unit 35 and the observation head 5 with the bellows member 44, problems such as the laser light leaking outside and external light getting in through the opening 35a of the scanning unit 35 and causing noise in the fluorescence image are prevented; however, the bellows member 44 is not absolutely essential. In particular, if the scanning unit 35, the observation head 5, and the living organism A are all disposed inside a black box so as to be covered, the problems described above are eliminated, and the free movement of the observation head 5 relative to the scanning unit 35 is not inhibited.

In the in-vivo examination apparatus 30 according to this embodiment, the optical unit 33 and the scanning unit 35 are connected with the optical fiber 34. Because the optical unit 33 includes large, heavy devices, such as the laser light source 31 and the light detector 32, it is difficult to change the orientation freely; however, by making the scanning unit 35 independent of the optical unit 33 which includes these devices, it is possible to freely adjust the orientation and position of the scanning unit 35 by freely bending the optical fiber 34, and by aligning the observation head 5 with the direction of movement of the examination target site B, it is possible to acquire fluorescence images with higher resolution. In such a case, in the raising-and-lowering mechanism 13 attached to the support column 12, it is preferable to provide a position adjusting mechanism, such as an angle adjusting mechanism or an articulated arm, which is not shown in the drawings.

However, when the direction of movement of the examination target site B is determined in advance, such an adjusting mechanism is not necessary. Therefore, as shown in FIG. 4, it is possible to use an in-vivo examination apparatus 50 in which only the observation head 5 can move in the optical axis direction relative to a fixed apparatus main unit 57 in which laser light sources 51 to 53, light detectors 54 to 56, and a beam scanning unit 41 are fixed relative to each other.

Doing so affords an advantage in that it is possible to dispose large optical components at positions where they are fixed relative to each other, not only the beam scanning unit 41, which is easily affected by movement due to acceleration and so on, and it is thus possible to perform high-precision observation.

Figure 4:
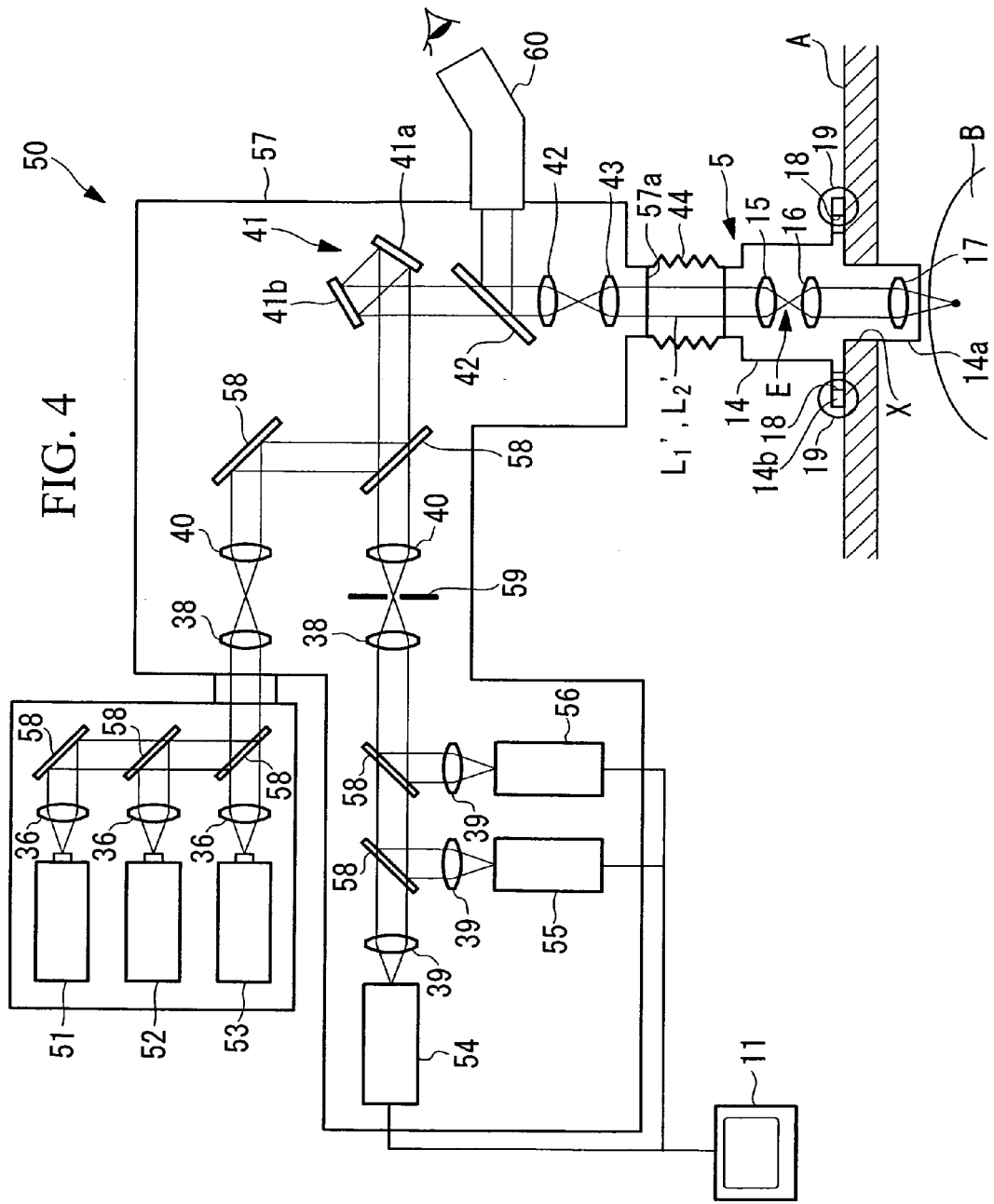
FIG. 4 is a diagram showing the overall configuration of a modification of the in-vivo examination apparatus in FIG. 3.

FIG. 4 shows a case including the plurality of laser light sources 51 to 53 of different wavelengths and the plurality of light detectors 54 to 56 for detecting each different wavelength. Reference numeral 58 in the figure indicates a mirror or dichroic mirror, reference numeral 59 indicates a confocal aperture, and reference numeral 60 indicates an eyepiece unit.

Next, an in-vivo examination apparatus 30A according to a fourth embodiment of the present invention will be described with reference to FIG. 5.

In the description of this embodiment, parts having the same configuration as in the in-vivo examination apparatus 30 according to the third embodiment described above are assigned the same reference numerals, and a description thereof shall be omitted.

Figure 5:
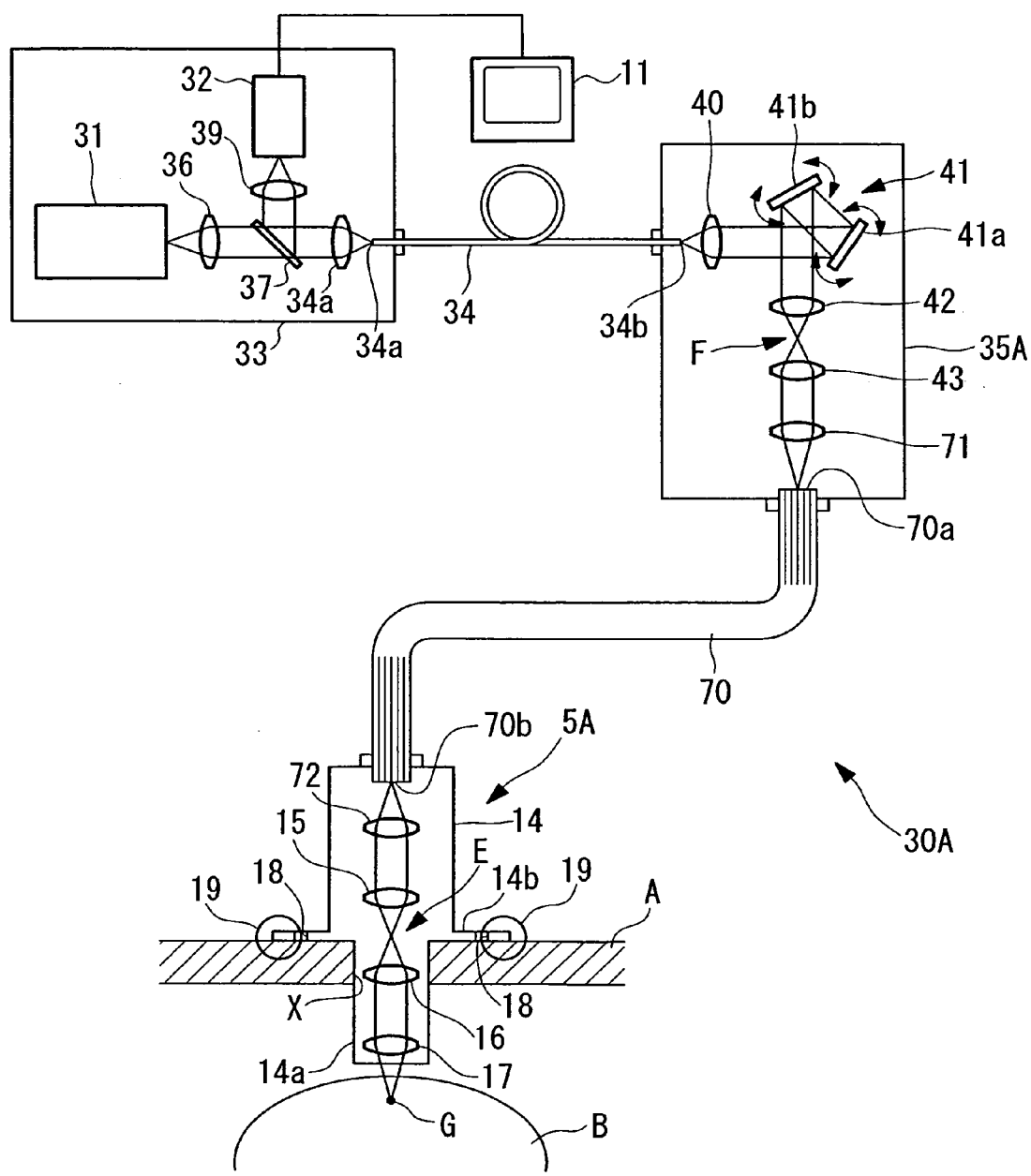
FIG. 5 is a diagram showing the overall configuration of an in-vivo examination apparatus according to a fourth embodiment of the present invention.

As shown in FIG. 5, the in-vivo examination apparatus 30A according to this embodiment includes an optical unit 33 including a laser light source 31 and a light detector 32; an optical fiber 34 for transmitting laser light from the laser light source 31 and fluorescence to the light detector 32; a scan head 35A for two-dimensionally scanning the laser light transmitted by the optical fiber 34; an observation head 5A which is fixed to a living organism A, such as a laboratory animal; and an optical fiber bundle 70 for connecting the scan head 35A and the observation head 5A.

The scan head 35A includes a first collimator optical system 40 for converting the laser light transmitted by the optical fiber 34 into collimated light; a beam scanning unit 41 for deflecting and two-dimensionally scanning the collimated light; a first pupil-projection optical system 42 for imaging the light emitted from the beam scanning unit 41 at a first intermediate image position F; a first image-forming optical system for re-converting the light forming the intermediate image into collimated light; and a first objective optical system for re-imaging the collimated light emitted from the image-forming optical system 43 on one end face 70a of the optical fiber bundle 70.

The observation head 5A includes, inside a casing 14 connected to another end face 70b of the optical fiber bundle 70, a second collimator optical system 72 for converting the light from the scan head 35A transmitted by the optical fiber bundle 70 into collimated light; a second pupil-projection optical system 15 for imaging the collimated light at a second intermediate image position E; a second image-forming optical system 16 for re-converting the light forming the intermediate image into collimated light; and a second objective optical system 17 for re-imaging the collimated light emitted from the image-forming optical system 16 at an examination target site G in an internal organ or the like of the living organism A.

The optical fiber bundle 70 may include a plurality of cores integrated into a bundle by means of the clad material or a plurality of bundled optical fibers, and by flexibly bending it with an external force, it is possible to freely change the relative distance and relative angle of the observation head 5A with respect to the scan head 35A.

The operation of the in-vivo examination apparatus 30A according to this embodiment, having such a configuration, will be described below.

The laser light emitted from the laser light source 31 is transmitted through the optical fiber 34 and enters the scan head 35A, and after being converted to collimated light by the first collimator optical system 40, it is deflected by the beam scanning unit 41 and imaged via the first pupil-projection optical system 42, the first image-forming optical system 43, and the first objective optical system 71 onto one end face 70a of the optical fiber bundle 70, which it enters. Then, the laser light transmitted through the optical fiber bundle 70 enters the observation head 5A fixed to the living organism A, and after being converted to collimated light by the second collimator optical system 72, it is imaged via the second pupil-projection optical system 15, the second image-forming optical system 16, and the second objective optical system 17 at the examination target site B inside the living organism A, where it generates fluorescence.

The fluorescence generated at the examination target site B enters the observation head 5A via the second objective optical system 17 at the end of the observation head 5A, returns inside the optical fiber bundle 70 via the second image-forming optical system 16, the second pupil-projection optical system 15, and the second collimator optical system 72, is transmitted through the optical fiber bundle 70, and returns to the scan head 35A. In the scan head 35A, it passes through the optical fiber 34 via the first objective optical system 71, the first image-forming optical system 43, the first pupil-projection optical system 42, the beam scanning unit 41, and the first collimator optical system 40, returns to the optical unit 33, is split off from the optical axis oriented in the direction of the laser light source 31 by the dichroic mirror 37, is detected by the light detector 32, and is displayed on the monitor 11.

In this case, because the image position G at the examination target site B and the end face 34b of the optical fiber 34 in the scan head 35A are disposed in a conjugate positional relationship with each other by the second objective optical system 17, the end face 34b of the optical fiber 34 functions as a confocal pinhole. Therefore, only return light emitted from the image position G at the examination target site B is introduced into the optical fiber 34 to return to the optical unit 33, and only fluorescence included therein is detected by the light detector 32. As a result, light emitted from regions outside the image position G in the examination target site B is not displayed on the monitor 11, and a two-dimensional image covering the image position G is clearly displayed.

With the in-vivo examination apparatus 30A according to this embodiment, the scan head 35A and the observation head 5A are separated and connected with the flexible optical fiber bundle 70. Therefore, by freely bending the optical fiber bundle 70, it is possible to freely change the relative position and orientation of the observation head 5A with respect to the scan head 35A.

Because the scan head 35A includes movable components such as the proximity galvanometer mirrors 41a and 41b, it tends to become comparatively large and heavy; however, by separating it from the observation head 5A, it is possible for the observation head 5A to have a compact and lightweight construction. Therefore, even though the observation head 5A is fixed to the living organism A, a large load is not placed on the living organism A, and even when the observation head 5A is fixed to the living organism A, the stress placed on the living organism A is reduced, allowing normal activity, and it is possible to perform observation of the living organism A under conditions closer to a resting state.

Because the scan head 35A has movable components such as the proximity galvanometer mirrors 41a and 41b, when a large acceleration is applied, there is a possibility that the operation of the proximity galvanometer mirrors 41a and 41b will be affected thereby, and it may not be possible to perform scanning correctly. However, it is possible to avoid such problems by separating the scan head 35A from the observation head 5A, which is fixed to the living organism A, and securing it outside the living organism A, as in this embodiment.

In the embodiment described above, the scan head 35A is disposed so as to be fixed outside the living organism A. Instead of this, however, the scan head 35A may be supported so as to be capable of moving one-dimensionally or two-dimensionally in the horizontal direction, and the scan head 35A may be moved in a tracking manner according to the distance moved by the observation head 5A, which moves together with the living organism A. In such a case, it is necessary to move it with low acceleration so that the proximity galvanometer mirrors 41a and 41b in the scan head 35A are not affected by the acceleration.

As the optical fiber bundle 70 becomes longer, its weight increases, and the load placed on the living organism A thus increases; however, by using the movable scan head 35A as described above, the length of the optical fiber bundle 70 can be minimized, which allows the load placed on the living organism A to be reduced. Also, it is possible to widen the operating range of the observation head 5A, which allows the conditions inside the living organism A under during free activity to be observed without restricting the normal range of activity of the living organism.

In the embodiment described above, the scan head 35A and the observation head 5A are connected by the optical fiber bundle 70; however, it is possible to connect the optical unit 4 and the observation head 5 shown in FIG. 1 and FIG. 2 with the optical fiber bundle 70. In such a case, an optical system (equivalent to the first objective optical system 71) for re-imaging the collimated light on the end face 70a of the optical fiber 70 is necessary in the optical unit 4. Furthermore, an optical system (equivalent to the collimator optical system 72) for converting the light transmitted by the optical fiber bundle 70 into collimated light is necessary in the observation head 5.

The invention claimed is:

1. An in-vivo examination apparatus comprising:
   an optical unit including a light source and an image acquisition device; and
   an observation head, which is disposed with a gap with respect to the optical unit and which is fixed to a living organism,
   wherein the optical unit includes a first collimator optical system for converting light from the light source into collimated light and introducing the collimated light into the observation head and an image-forming optical system for focusing return light from the observation head to form an image at the image-acquisition device, and
   wherein the observation optical head includes a second collimator optical system for focusing the collimated light introduced from the optical unit to irradiate an examination target site in the living organism, as well as for converting return light from the living organism into collimated light and introducing the collimated light into the optical unit.

2. An in-vivo examination apparatus according to claim 1, wherein the image-forming optical system is formed of an fθ lens.

3. An in-vivo examination apparatus according to claim 2, wherein the optical unit and the observation head are connected by an optical fiber bundle.

4. An in-vivo examination apparatus according to claim 1, wherein the optical unit and the observation head are connected by an optical fiber bundle.

5. An in-vivo examination apparatus according to one of claim 1, wherein fixing means for fixing the observation head to the living organism is provided in the observation head.

6. An in-vivo examination apparatus comprising:
   a light source;
   a scanning unit for two-dimensionally scanning light from the light source;
   an observation head, fixed to a living organism, for irradiating the living organism with the light scanned by the scanning unit and receiving return light from the living organism; and
   a light detector for detecting the return light received by the observation head,
   wherein scanning unit includes a first collimator optical system for converting the scanned light into collimated light and introducing the collimated light into the observation head, and
   wherein the observation head includes a second collimator optical system for focusing the collimated light introduced from the scanning unit to form an image at an examination target site in the living organism, as well as for converting the return light from the living organism into collimated light and introducing the collimated light into the scanning unit.

7. An in-vivo examination apparatus according to claim 6, wherein the observation head and the scanning unit are connected by an optical fiber bundle.

8. An in-vivo examination apparatus according to claim 6, wherein fixing means for fixing the observation head to the living organism is provided in the observation head.

* * * * *